UNITED STATES PATENT OFFICE.

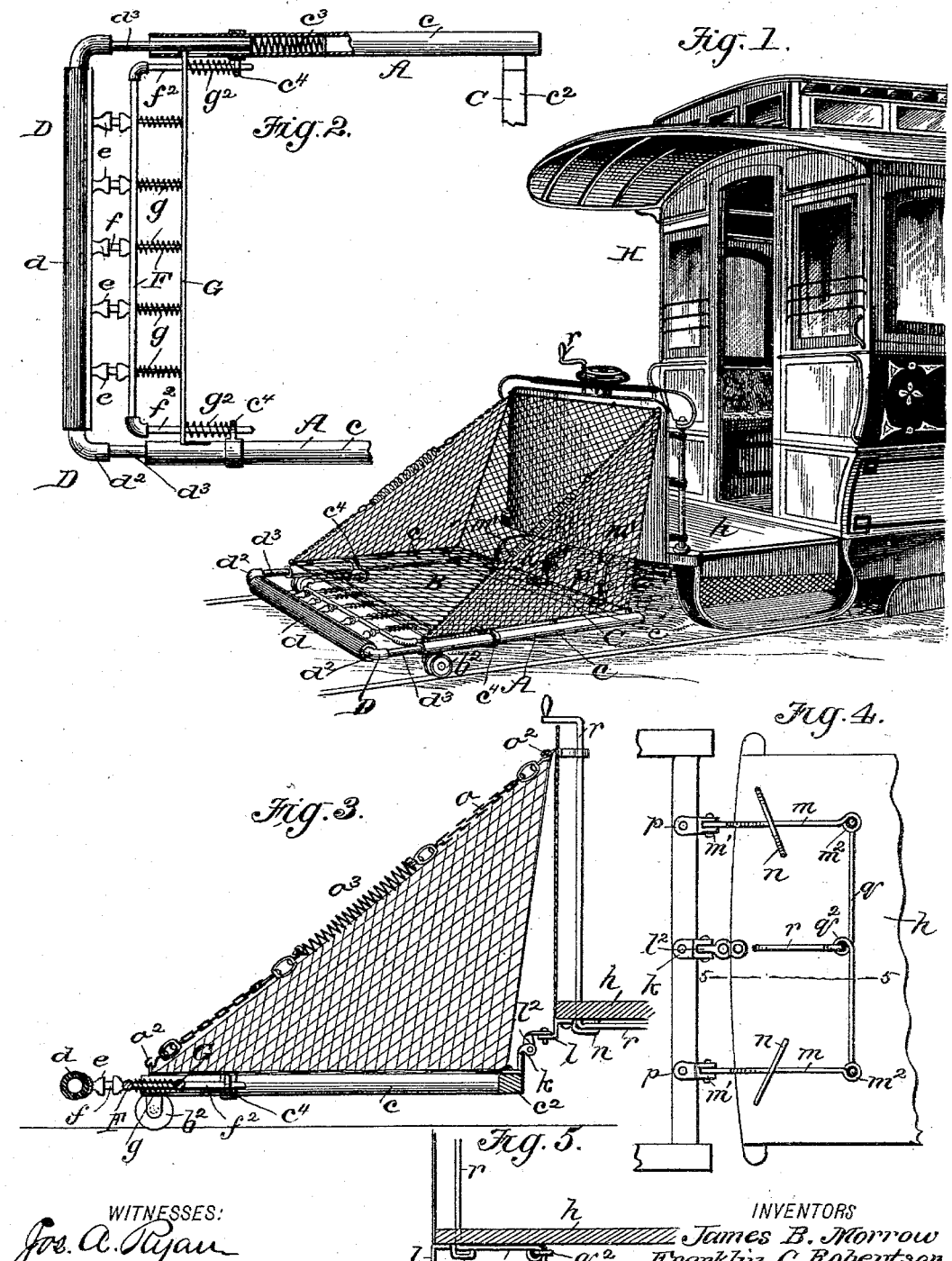

JAMES B. MORROW AND FRANKLIN C. ROBERTSON, OF OXFORD, MARYLAND.

CAR-FENDER.

SPECIFICATION forming part of Letters Patent No. 552,852, dated January 7, 1896.

Application filed May 15, 1895. Serial No. 549,424. (No model.)

*To all whom it may concern:*

Be it known that we, JAMES B. MORROW and FRANKLIN C. ROBERTSON, of Oxford, in the county of Talbot and State of Maryland, have invented a new and useful Improvement in Car-Fenders, of which the following is a specification.

Our invention relates to improvements in car-fenders, and has for its object to provide a fender which will not injure the person struck thereby and which will catch and support the person so struck.

The invention has also for its object to provide a fender which can be readily attached or detached from a car, and which can be raised or lowered at pleasure from the platform of the car.

A still further object of the invention is to provide a fender of this character which is very simple and cheap.

The invention consists in the particular construction and combination of parts, as hereinafter fully described and pointed out in the claims.

Reference is to be had to the accompanying drawings, forming a part of this specification, in which similar letters of reference refer to corresponding parts in all the views.

Figure 1 is a perspective view of the improvement and a portion of a car. Fig. 2 is a plan view of the fender with the netting removed and partly in section and with parts broken away. Fig. 3 is a side elevation of the improvement. Fig. 4 is an inverted plan view of a portion of the car-platform and the rear end of the fender-frame, and Fig. 5 is a detail sectional view.

The fender consists of a frame A covered with netting B, which is formed of suitable material and extends up the sides and at the rear, as will be hereinafter more fully explained.

The frame A is formed of the rear section C secured to the car and the front or sliding section D. The rear section C consists of the side bars $c$, which are preferably tubular and are connected at their rear ends by the bar $c^2$. The front section D consists of the rubber tube $d$ connected at its ends by couplings $d^2$ to the side bars $d^3$, which fit and slide in the side bars $c$ of the rear section C. In the side bars $c$ are arranged springs $c^3$, against which the ends of the side bars $d^3$ of the front section abut, so that the said front section is normally held projected, as shown in Fig. 2, but which will slide in the said bars $c$ when an obstruction is met.

The rubber tube $d$ is preferably provided with a metallic backing on its rear face and from which projects the sockets $e$, which receive the projections $f$ of the rod F, whose ends $f^2$ are bent rearwardly and parallel with the bars $c$ of the section C and work in guides $c^4$ thereon. Between the bar F and the bar G, which has its ends sliding in guideways or slots in the bars $c$, are arranged the springs $g$, and surrounding the ends $f^2$ of the bar F, between the bar G and the guides $c^4$, are placed the springs $g^2$.

The bars F and G form a yielding frame, and as the springs $g$ are stronger than the springs $c^3$ and the springs $g^2$ stronger than the springs $g$ the front section of the fender will yield easily and gradually.

From the above-described construction it will be seen that when an object is struck the side bars $d^3$ of the section D will be forced into the side bars $c$ of the section C against the springs $c^3$ therein, and at the same time the sockets $e$ will be forced onto the projections $f$, and this will force the bar F rearward against the springs $g$ and the bar G against the springs $g^2$, the ends $f^2$ of the bar F sliding in the guides $c^4$ and the ends of the bar G in the slots of the bars $c$, whereby the person struck will sustain but little if any shock.

The frame A is preferably supported on flanged wheels $b^2$, as shown, and is hinged to the platform $h$ of the car H. While the fender can be hinged in any suitable manner, yet we prefer to hinge it as shown in the drawings, wherein it is shown pivoted at the center and sides to the platform $h$ of the car H.

To the center of the platform $h$ of the car is secured the bracket $l$, and to this bracket is pivoted, so as to swing horizontally, the angle-arm $l^2$, and the other end of the said angle-arm $l^2$ is pivoted to the bracket $k$ on the rear bar $c^2$ of the fender-section C, so that the fender can swing vertically. On the rear bar $c^2$ of the fender-section C near its ends are secured the brackets $p$, and to these brackets are hinged the arms m, which work in keepers or guides n on the under side of the platform of the car.

The pivot-pins of the above-described parts are all removable, so as to permit the fender to be readily attached or detached.

To the eyes $m^2$ in the arms m is secured the bar q, and the said bar q is provided at its center with an eye $q^2$, to which is secured the lower crank end of the operating-shaft r, which passes up through the platform h.

By means of the shaft r and its connection with the arms m the fender can be moved slightly laterally when desired.

By thus connecting the fender to the car it can readily turn curves without danger of leaving the track or projecting too far to one side and can be readily swung upon its pivots to raise or lower it. The netting B is secured over the frame and extends up the side and at the rear, as before stated, and to the upper edges of the sides of the netting is preferably secured the chains o, which have one end secured to the side bars c and are provided with hooks $o^2$ at its ends to engage the dashboard of the car and the fender to hold the latter in position.

The chains o are attached to the sides of the netting and are preferably provided with the springs $o^3$, so that they will yield as the fender swings from side to side. The springs are arranged about midway of the chains and are connected thereto by swivels, as clearly shown in Fig. 3. The chains o not only serve to strengthen the netting, but also serve as means by which the fender can be raised and lowered from the platform of the car.

It will thus be seen that by our improved fender a person will not be injured by being struck and that when struck will be caught and supported thereby.

Having thus described our invention, what we claim, and desire to secure by Letters Patent, is—

1. A car fender, comprising a fixed section, a yielding section, carried by the fixed section, and a yielding frame interposed between the said sections, substantially as described.

2. A car fender, comprising a fixed section, a spring pressed section sliding in the fixed section, and a spring pressed frame interposed between the said sections, substantially as described.

3. In a car fender, the combination with a fixed section, and a sliding and spring pressed section carried by the fixed section, of a spring pressed bar, projections on the bar, and sockets on the sliding section and into which the projections extend, substantially as described.

4. In a car fender, the combination with the fixed section, and a sliding and spring section carried thereby, of a spring pressed and sliding bar, projections on the sliding bar, sockets on the sliding section into which the projections of the bar project, and a second spring pressed bar in rear of and operated by the first bar, substantially as described.

5. In a car fender, the combination with a fixed section, and a sliding and spring pressed section carried thereby, of a bar having bent ends working in guides on the fixed section, projections on the bar, sockets on the sliding section into which the projections extend, a second bar sliding in the fixed section, springs arranged between the two bars, and springs surrounding the ends of the first bar between the guides and the second bar, substantially as described.

6. In a car fender, the combination with a fixed rear section having its sides formed of tubular bars, of a sliding front section having its end bars projecting into the tubular side bars of the rear section, springs in the said side bars of the rear section, and a spring pressed frame interposed between the two sections substantially as described.

7. The combination with a car, of a fender hinged at its center to the car, and arms fitted to slide on the under side of the car at each side of the center and hinged to the fender, substantially as described.

8. The combination with a car, of a fender hinged at its center to the car, arms fitted to slide on the under side of the car at each side of the center and hinged to the fender, a bar connected to the inner ends of the arms, and an operating shaft having on its lower end a crank arm connected with the said bar, substantially as described.

JAMES B. MORROW.
FRANKLIN C. ROBERTSON.

Witnesses:
C. H. RAWLINS,
J. B. PARROTT.